Oct. 29, 1935. W. STELZER 2,018,928
WHEEL
Filed July 28, 1930
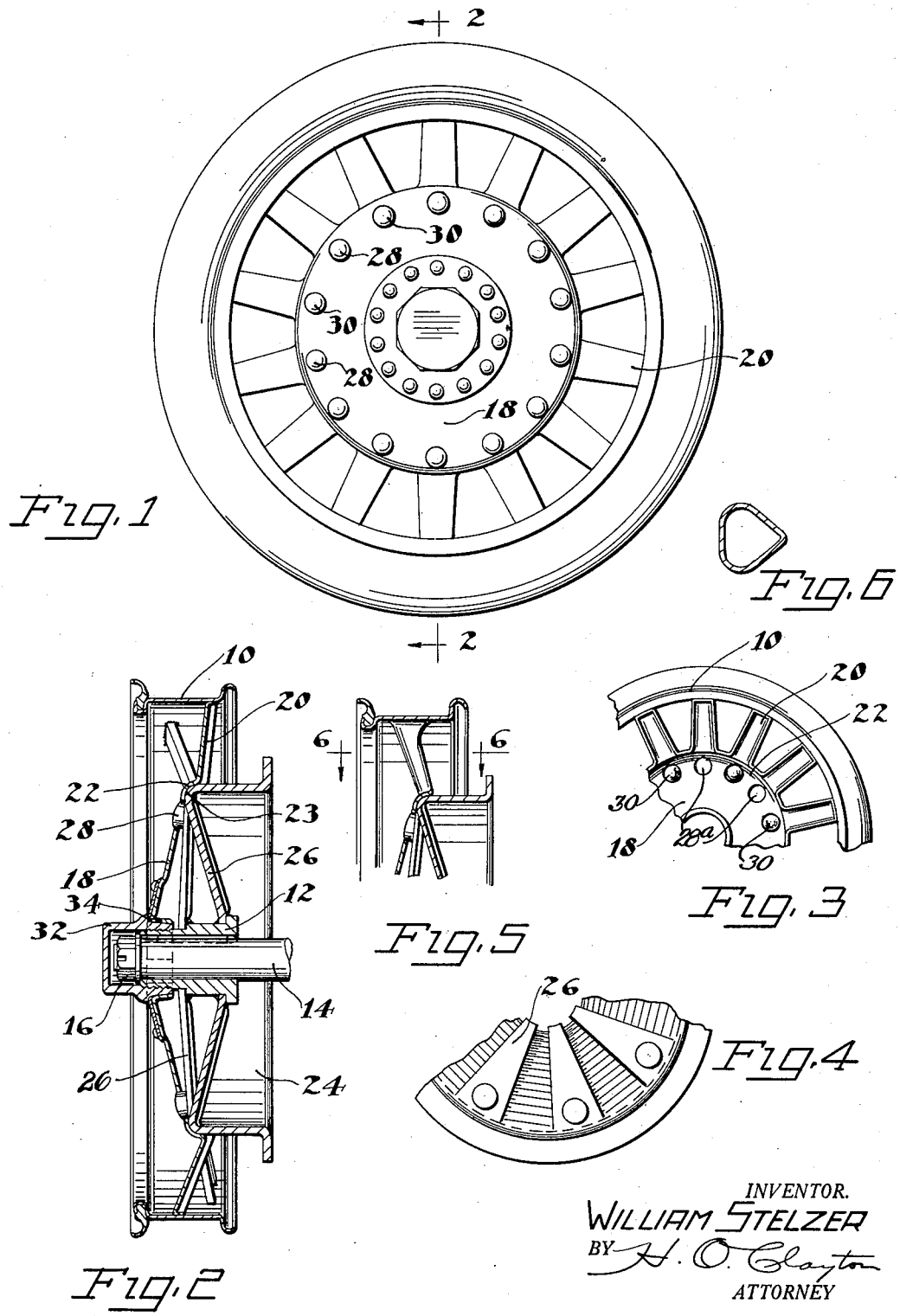
INVENTOR.
WILLIAM STELZER
BY H. O. Clayton
ATTORNEY Patented Oct. 29, 1935

2,018,928

UNITED STATES PATENT OFFICE 2,018,928

WHEEL

William Stelzer, South Bend, Ind., assignor to Bendix Brake Company, South Bend, Ind., a corporation of Illinois Application July 28, 1930, Serial No. 471,123

4 Claims. (Cl. 301—6)

This invention relates to wheels in general and more particularly to a wheel of the compression type equally adaptable for both automobiles and airplanes.

It is a prime desideratum that the modern wheel employed in these arts have an esthetic value, be light of weight and sufficiently strong to withstand both normal as well as lateral stresses, and withal be cheaply and quickly fabricated and assembled. It is therefore the principal object of the invention to provide a compression wheel fulfilling these qualifications.

More specifically, it is an object of the invention to provide a wheel structure wherein the brake drum thereof may perform its normal braking function and at the same time serve as one part of a two-part wheel structure, serving as a centering and supporting means for the remaining part.

It is a further object of the invention to provide a wheel so constructed that the parts thereof are placed under compression when the same is under lateral or side thrust, thereby minimizing bending of the parts.

While the foregoing statement is indicative in a general way of the objects of the invention, other objects and advantages not specifically referred to in this disclosure will be obvious upon a full understanding of the wheel structure referred to herein and particularly the method of forming the same as set forth in the following description and accompanying drawing wherein is presented what is now considered to be the preferred embodiments of the invention. It will be understood, however, that these particular embodiments are shown primarily for the purpose of exemplification and are not intended either to restrict in any way the spirit of the invention or to limit the scope of the appended claims.

In the drawing:

Figure 1 is a side elevation of the wheel structure constituting my invention,

Figure 2 is a vertical section taken through the wheel structure taken on line 2—2 of Figure 1.

Figure 3 discloses a fragmentary portion of one of the disc body members looking toward the inner surface of said member, Figure 4 discloses in side elevation, a fragmentary portion of the brake drum structure, Figure 5 discloses a modified form of spoke structure, on the outer wheel part, and Figure 6 is a transverse section through the spoke structure of Figure 5 taken on line 6—6 thereof.

In that embodiment of the invention disclosed most clearly in Figure 2, there is shown the conventional type of Q. D. rim 10 supported by my novel wheel body structure, hereinafter described, the latter mounted on a conventional hub member 12 keyed to a rear driving axle 14 the usual axle nut 16 abutting the end face of the hub. The wheel body could with equal facility be secured to a rotatably mounted front wheel hub structure.

The body of the wheel which constitutes my invention is designed as an improvement over the wheel disclosed in Patent #1,387,179 of H. D. Rey. In that patent, tightening of a hub nut serves to effect by toggle action the securing of oppositely inclined disc body members to the hub and rim. I propose, however, to reconstruct the wheel of this patent in such manner as to retain all of its virtues and at the same time produce at lesser cost a more efficient wheel.

As clearly indicated in Figure 2, my wheel comprises a cone-shaped disc body member 18 preferably either pressed or stamped to the shape disclosed, the outer periphery of which disc, from intermediate its central portion, being provided with oppositely inclined channel shaped spoke portions 20. Alternate spokes are inclined in the same direction, the opposite inclination of the two series providing a staggered effect. The spokes are integrally secured at their peripheral edges to the inner surface of Q. D. rim member 10 as more clearly brought out in the novel method hereinafter described.

The body member 18 at the periphery of its imperforate portion is provided with an annular recess 22 positioned in or immediately adjacent the load plane of the wheel. This recess is adapted to receive the machined rounded apex 23 constituting the junction between the head and flange of a brake drum 24. The head or vertically extending portion of the drum is preferably constructed of what might be termed spoke segments 26, which segments are staggered in a manner similar to the aforementioned disc spoke segments 20. The spoke segments of the brake drum head are preferably integrally secured, as by welding, to the hub of the wheel.

Lugs or studs 28 may be secured to the outer of the segments in the brake drum, which studs are received within openings 28a in the disc member 18, these parts transmitting both driving and braking torque to the body of the wheel. Intermediate the aforementioned openings, the disc 18 is provided with embossments 30 simulating the studs 28 thereby enhancing the esthetic effect of the wheel.

The disc member 18 is demountably secured to the hub by a hex nut member 32 threadedly engaging the end of the hub 12 and wedgingly receiving on its outer surface laterally directed tongues 34 on the disc body member, the latter serving to lock the nut in position. It is particularly significant that the aforementioned apex of the brake drum functions as a thrust transmitting or load receiving area of contact and that this portion of the drum also serves to center and position the wheel body member 18 in the assembling of the wheel.

The outboard series of spoke segments of the brake drum preferably lie in or immediately adjacent the load plane of the wheel and substantially bisect the angle formed by the inboard series of segments of the brake drum and the imperforate central portion of the disc body element. It is also desirable that all parts of the brake drum head and disc body member save the aforementioned central segments be inclined at such an angle that the same are normally placed under a direct compression load when side thrust and other lateral strains are imposed upon the wheel in service.

In fabricating the two-part wheel just described, I propose to first shape the disc body element and brake drum as indicated. The hub 12 and brake drum are then held in concentric relation in suitable fixtures whereupon the spoke segments 26 of the brake drum are welded to the hub. The junction of the braking flange and head is then carefully machined to provide a surface concentric with the axis of the wheel, thereby insuring the correct positioning of the remaining wheel body member when assembled with the drum.

The remaining part of the wheel is fabricated by holding the disc body member 18 rigidly to a fixture simulating the brake drum with the recess 22 positioned over the corresponding apex portion of the fixture. The rim member of the wheel is then positioned concentrically of the drum fixture and the spokes pressed laterally inwardly into contact with the inner surface of the rim. It is important that each of the spokes be placed under equal compression in this pressing operation whereupon the ends of the spokes are then welded by suitable means, such as spot welding, to the rim surface.

In Figures 5 and 6 I have disclosed a modified form of spoke structure on the disc body member, the same being substantially triangular in cross section and preferably inclined in an opposite direction from the inclination of the imperforate center portion of the body member as indicated in Figure 5.

There is thus provided a very rugged structure providing a brake drum serving its normal function as a braking member and at the same time functioning as a wheel body member. The apex of the drum, as previously referred to, serves both as a centering means for the remainder of the wheel structure as well as a seat to take the load thrusts. The segmental spoke portions of the wheel parts are inclined to take side thrusts under compression without bending and the major portion of the wheel may be quickly demounted by the single hub nut. The outer spoke portions also serve to cool the brake drum by conducting heat away from the braking flange thereof.

While I have illustrated and described somewhat in detail certain embodiments of my invention, it is not my intention to limit the scope of the invention to these particular embodiments or otherwise than by the terms of the appended claims.

I claim:

1. A wheel comprising rim and hub members, a disc body member having spoke portions rigidly secured to the wheel rim and a brake drum member engaging said disc body member in the load plane of the wheel at the base of said spoke portions, a portion of the head of said drum and said disc member being inclined to said load plane to place said portions under compression without substantial bending when the wheel parts are under lateral stress, said brake drum having the head or body portion thereof constructed of oppositely inclined spokes.

2. A wheel structure including a body constituted in part of oppositely inclined portions of a brake drum head, together with a disc oppositely inclined to at least some of the oppositely inclined portions of the drum and having spokes extending from its periphery.

3. A wheel structure including a body portion constituted in part of oppositely inclined portions of a brake drum head, together with a disc body part oppositely inclined to at least some of the inclining portions of the brake drum head, spokes on the periphery of the disc body part, some of said head portions lying substantially in the load plane of the wheel and substantially bisecting the angle formed by the remaining parts.

4. A wheel comprising hub and rim members, a brake drum having a head split into spokes secured to said hub in staggered relation toward one end thereof, and a disc member adapted to be adjustably secured on the other end of said hub, said disc member being slightly cupped around the head end of said brake drum, and thence extending in the form of spokes to said rim member, said last named spokes being secured to said rim member in staggered relation.

WILLIAM STELZER.